(12) United States Patent
Chen

(10) Patent No.: US 11,448,338 B2
(45) Date of Patent: Sep. 20, 2022

(54) NEGATIVE PRESSURE PIPELINE OPENING AND CLOSING DEVICE

(71) Applicant: Shanghai ZTEC Environmental S&T CO., LTD., Shanghai (CN)

(72) Inventor: Liguo Chen, Shanghai (CN)

(73) Assignee: Shanghai ZTEC Environmental S&T CO., LTD., Shanghai (CN)

( * ) Notice: Subject to any disclaimer, the term of this patent is extended or adjusted under 35 U.S.C. 154(b) by 46 days.

(21) Appl. No.: 16/902,337

(22) Filed: Jun. 16, 2020

(65) Prior Publication Data

US 2021/0071777 A1 Mar. 11, 2021

(30) Foreign Application Priority Data

Sep. 11, 2019 (CN) .......................... 201910859483.3
Dec. 27, 2019 (CN) .......................... 201911383233.3

(51) Int. Cl.
*F16K 31/28* (2006.01)
*F16K 1/14* (2006.01)
(Continued)

(52) U.S. Cl.
CPC ................ *F16K 31/28* (2013.01); *F16K 1/14* (2013.01); *F16K 1/32* (2013.01); *F16K 27/0245* (2013.01);
(Continued)

(58) Field of Classification Search
CPC . F16K 31/28; F16K 31/22; F16K 1/14; F16K 1/32; F16K 27/0245; G05D 9/02;
(Continued)

(56) References Cited

U.S. PATENT DOCUMENTS 1,831,318 A * 11/1931 O'Neil et al. .......... F16K 17/42
137/399
3,095,005 A * 6/1963 Thompson .............. F16K 31/22
137/268
(Continued)

FOREIGN PATENT DOCUMENTS

CA 2451396 A1 1/2003
CA 2498974 A1 4/2004
(Continued)

OTHER PUBLICATIONS

Machine Translation of WO9960221A1 (Boehm et al.) dated Nov. 1999. (Year: 1999).*
(Continued)

*Primary Examiner* — Craig J Price
*Assistant Examiner* — Andrew J Rost

(57) ABSTRACT

A negative pressure pipeline opening-and-closing device includes a blocking member and a buoyant member. The buoyant member comprises two floats and a connection rod connected to the two floats. The liquid reservoir is provided with a guide therein, and the guide confines the two floats, the blocking member and the liquid outlet port in the same vertical line. A limiting member is arranged between the two floats and is fixed to an inner wall of the liquid reservoir. A maximum distance between the limiting member and a top wall of a lower float of the two floats is smaller than a maximum distance between a top wall of an upper float of the two floats and a top wall of the liquid reservoir. The negative pressure pipeline opening-and-closing device can replace an existing electrically controlled valve. Therefore, the cost is reduced, the maintenance is convenient and service life is prolonged.

5 Claims, 10 Drawing Sheets

(51) Int. Cl.
  *F16K 1/32* (2006.01)
  *F16K 27/02* (2006.01)
  *F16K 31/22* (2006.01)
(52) U.S. Cl.
  CPC ......... *F16K 31/22* (2013.01); *Y10T 137/7404* (2015.04); *Y10T 137/7436* (2015.04)
(58) Field of Classification Search
  CPC ......... Y10T 137/7436; Y10T 137/7413; Y10T 137/7404; Y10T 137/7754; Y10T 137/7426
  See application file for complete search history.

(56) References Cited

U.S. PATENT DOCUMENTS

| | | | | |
|---|---|---|---|---|
| 5,176,167 | A | * | 1/1993 | Tiao ........................ F16K 31/28 122/504 |
| 5,381,956 | A | * | 1/1995 | Robinson ................ B05B 17/08 239/22 |
| 6,238,567 | B1 | * | 5/2001 | Van de Moortele .. B01F 1/0022 210/123 |
| 6,551,504 | B2 | * | 4/2003 | Reed ....................... F16K 31/28 210/97 |
| 2010/0000917 | A1 | | 1/2010 | Zook |

FOREIGN PATENT DOCUMENTS

| | | |
|---|---|---|
| CN | 203035271 U | 7/2013 |
| CN | 204004725 U | 12/2014 |
| CN | 206458451 U | 9/2017 |
| FR | 2131127 A5 | 11/1972 |
| WO | 99/60221 A1 | 11/1999 |

OTHER PUBLICATIONS

Partial European Search Report of counterpart European Patent Application No. 20195228.0 dated Jan. 14, 2021.

* cited by examiner

NEGATIVE PRESSURE PIPELINE OPENING AND CLOSING DEVICE

CROSS-REFERENCE TO RELATED APPLICATION

This application claims the priority benefits of Chinese application No. 201910859483.3 filed on Sep. 11, 2019 and No. 201911383233.3 filed on Dec. 27, 2019. The entirety of the above-mentioned patent applications is hereby incorporated by reference herein and made a part of this specification.

BACKGROUND

Technical Field

The present application relates to the technical field of liquid discharge, in particular to a negative pressure pipeline opening-and-closing device.

Description of Related Art

A float valve adjusts the amount of the supplied liquid by controlling the liquid level. The working principle of float valve is as below. The float valve is controlled to be opened or closed by a float member in a float chamber that rises or drops as the liquid level rises or drops.

A Chinese patent of Utility Model (Patent No. CN203035271U) discloses an automatic liquid discharging device of an airtight container, in which a float switch and a magnetic valve are connected in series by a 220 volt AC power source in a circuit. The float switch and the magnetic valve are placed at the bottom of the container. A normally-opened contact of the float switch is connected in series with a coil of a magnetic valve. When water continuously enters in the container and a water level rises to the location of the float switch in the container, a float of the float switch rises, and a magnet in the float attracts a magnetic reed switch to close the circuit so as to provide power. The coil of the magnetic valve is energized, so that the valve is opened automatically. The water is discharged out of the container. Until the water is drained, the float switch returns to the normally-open state. The power is cut off, and the coil of the solenoid valve is not energized. Therefore, the water in the tank has been drained.

The technical solution in the above utility model relates to an electronically controlled drainage device. The structure is complicated and the maintenance cost is large. In addition, the float in this solution is an instant response type device, and has a short stroke. Therefore, as long as the liquid level of a pool or water tank rises, the solenoid valve is opened to discharge the liquid. When the liquid level drops, the solenoid valve is immediately closed to stop the discharging of liquid, so as to achieve a dynamic balance of the liquid level. In the case, the solenoid valve is frequently opened and closed. Therefore, the device is easily damaged and has a low reliability.

SUMMARY

To overcome the shortcomings of the existing technology, the objective of the present application is to provide a negative pressure pipeline opening-and-closing device, in which the pipeline is opened or closed by mechanical means. Therefore, the negative pressure pipeline opening-and-closing device has a simple structure, is easy to maintain, and has a long control stroke and a high reliability.

The negative pressure pipeline opening-and-closing device of the present application can be implemented as below.

A negative pressure pipeline opening-and-closing device, which includes a blocking member for blocking a liquid outlet port of a liquid reservoir and a buoyant member connected to the blocking member.

The buoyant member comprises two floats and a connection rod connected to the two floats. The liquid reservoir is provided with a guide therein, and the guide confines the two floats, the blocking member and the liquid outlet port in the same vertical line. A limiting member is arranged between the two floats and is fixed to an inner wall of the liquid reservoir. A maximum distance between the limiting member and a top wall of a lower float of the two floats is smaller than a maximum distance between a top wall of an upper float of the two floats and a top wall of the liquid reservoir.

Preferably, the guide is a needle-shaped sliding axle that is fixed to the inner wall of the liquid reservoir, and the connection rod is a sleeve that is sleeved on the guide.

Preferably, the upper float and/or the lower float are hollow.

Preferably, the limiting member is a limiting ring with an opening, and an inner area of the limiting ring is smaller than the projection area of the lower float on a horizontal plane.

Preferably, a bottom of the upper float has a downward convex surface.

Preferably, a valve box is arranged in the liquid reservoir, accommodates the buoyant member, and is communicated with the liquid reservoir through top and bottom of the valve box.

The negative pressure pipeline opening-and-closing device of the present application can be further implemented as below.

A negative pressure pipeline opening-and-closing device includes a blocking member for blocking a liquid outlet port of a liquid reservoir and a buoyant member connected to the blocking member. The buoyant member comprises a float and a first connection rod. One end of the first connection rod is pivotably connected to an inside of the liquid reservoir. The first connection rod is rotated around a hinge point in a vertical plane. The float is connected to a location of the first connection rod far away from the hinge point.

The blocking member includes a blocking element and a second connection rod. The second connection rod is pivotably connected to the inside of the liquid reservoir and is rotated around the hinge point in a vertical plane. The blocking member is connected to a location of the second connection rod far away from the hinge point. The liquid outlet port of the liquid reservoir is located in a motion path of the blocking member that moves as the second connection rod moves, and an opening portion of the liquid outlet port is perpendicular to a tangential direction of the motion path.

The negative pressure pipeline opening-and-closing device further includes an energy transferring member, in which the energy transferring member transmits the potential energy of the buoyant member to the blocking member to drive the blocking member to rotate around a hinge point of the blocking member.

According to the above technical solutions, the float rises as the liquid level in the liquid reservoir rises. During this period, the float and the first connection rod rotate around the hinge point between the first connection rod and the standing plate. The energy is transferred to the blocking member by the energy transmitting member, such that the blocking member rotates with the float in the same direction to open the liquid outlet port. On the contrary, when the liquid level drops, the float drops as the liquid level in the liquid reservoir drops. During this period, the float and the first connection rod rotate in opposite direction around the hinge point of the first connection rod. The energy is transferred to the blocking member by the energy transmitting member, such that the blocking member rotates with the float in the same direction to close the liquid outlet port.

Preferably, the energy transferring member includes a first triggering element on the first connection rod, a second energy receiving element on the second connection rod, and an intermediate energy transferring element. The intermediate energy transferring element is pivotably connected to the inside of the liquid reservoir. The intermediate energy transferring element is rotated around the hinge point in the vertical plane. A rotation path of the intermediate energy transferring element and a motion path of the first triggering element and the second energy receiving element cross each other.

The intermediate energy transferring element is further provided with a third energy receiving element and a third triggering element. A rotation path of the first triggering element and a rotation path of the third energy receiving element cross each other. A rotation path of the third triggering element and a motion path of the second connection rod cross each other.

Preferably, a second triggering element is fixed on and perpendicular to the intermediate energy transferring element. The second triggering element is located in a rotation plane of the intermediate energy transferring element and extends toward the second energy receiving element. The liquid outlet port of the liquid reservoir is located in a motion path of the blocking member that moves as the second connection rod moves. An opening portion of the liquid outlet port is perpendicular to a tangential direction of the motion path.

Preferably, a first weight is fixed at an end of the intermediate energy transferring element far away from the hinge point. A motion path of the first weight passes directly above the hinge point of the intermediate energy transferring element. The third triggering element lies in a line of the first weight and a hinge point between the first weight and the intermediate energy transferring element in a location far away from the first weight.

In summary, the negative pressure pipeline opening-and-closing device provided by the present application has at least one of the following beneficial technical effects. By using only mechanical structure of the negative pressure pipeline opening-and-closing device to replace an existing electrically controlled valve, the cost is reduced, the maintenance is convenient and service life is prolonged.

DESCRIPTION OF THE EMBODIMENTS

The present application is further illustrated in detail in combination with the accompanying drawings hereinafter.

Embodiment I

Figure 1:
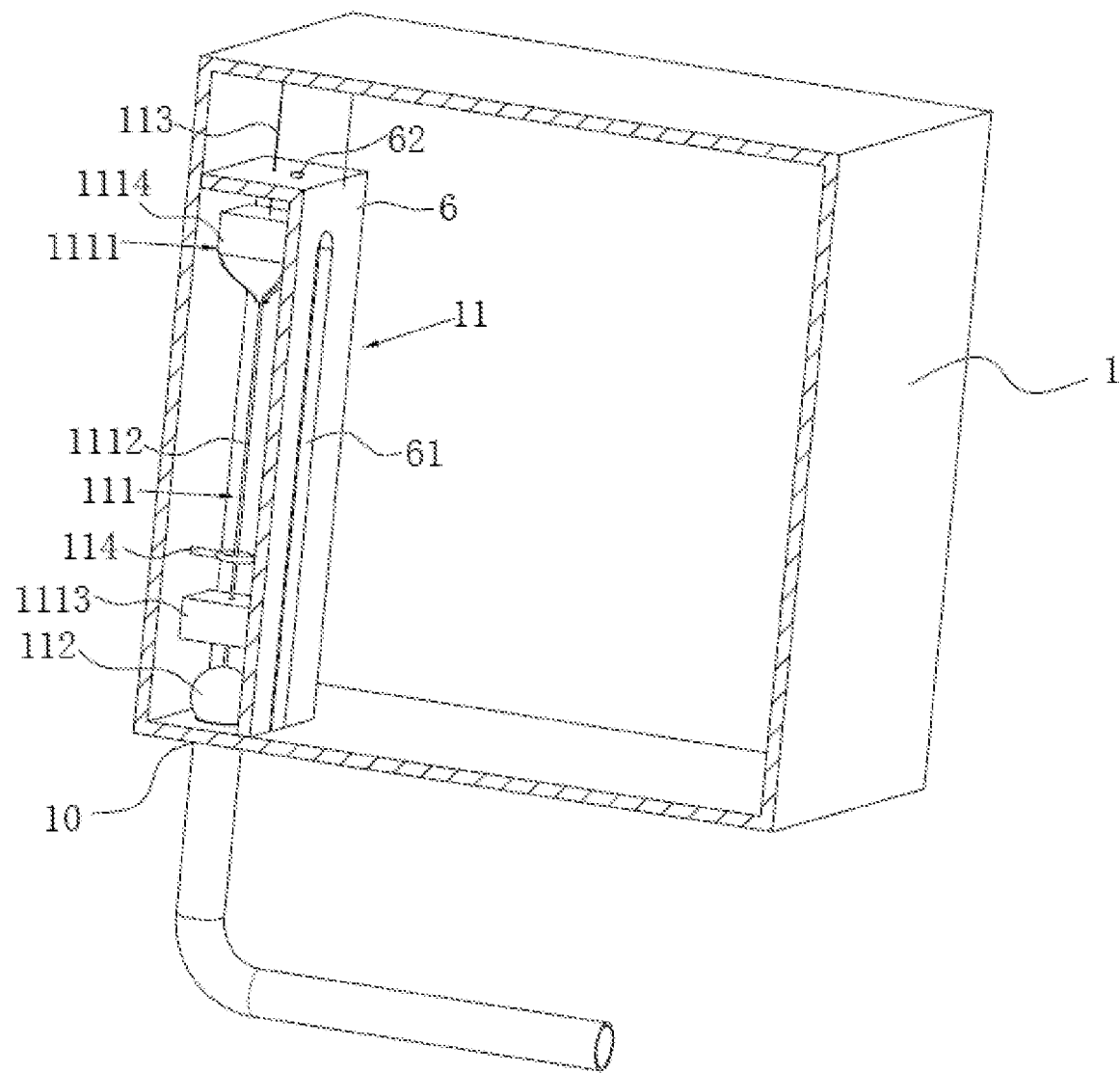
FIG. 1 is a schematic structural view showing a negative pressure pipeline opening-and-closing device of one of embodiment I to embodiment III of the present application.

The present application relates to a negative pressure pipeline opening-and-closing device that is applicable to a liquid reservoir 1, out of which the liquid is discharged through a liquid outlet port 10 by means of an underpressure, in particular, by a suction force applied from the exterior of the liquid reservoir 1. The negative pressure pipeline opening-and-closing device of the present application includes a buoyant member 111 and a blocking member 112 that is connected to the buoyant member 111. In this embodiment, the buoyant member 111 includes two floats 1111 and a connection rod 1112 that connects the two floats 1111 with each other. The two floats are a first float 1113 and a second float 1114 respectively. The connection rod 1112 is a sleeve extending through the centers of the first float 1113 and the second float 1114. The diameter and the wall thickness of the sleeve are so small that the buoyancy force thereof can be neglected. The first float 1113 and the second float 1114 are respectively arranged on both ends of the connection rod 1112. The blocking member 112 is a spherical member, and has a radius that is greater than an inner diameter of the liquid outlet port 10. The blocking member 112 is fixed on an extended end of the connection rod 1112 adjacent to the end on which the first float 1113 is arranged. As shown in FIG. 1, the liquid reservoir 1 is provided at its top with a guide 113. In this embodiment, the guide 113 is a needle-shaped sliding axle. The guide 113 and the liquid outlet port 10 lie in a same vertical line. The buoyant member 111 is sleeved on the guide 113 by the connection rod 1112. Therefore, the guide 113 confines the two floats 111, the blocking member 112 and the liquid outlet port 10 in the same vertical line. The first float 1113 is located below the second float 1114. When the liquid level reaches a height such that when the total buoyancy force of the buoyant member 111 and the blocking member 112 is greater than the sum of their total gravity and the suction force, the buoyant member 111 drives the blocking member 112 to rise, thereby opening the liquid outlet port 10 to start the discharge of liquid. The guide 113 ensures that the buoyant member 111 moves vertically up and down above the liquid outlet port 10, so as to prevent the blocking member 112 from being offset from the vertical line. Therefore, the blocking member 112 is able to close the liquid outlet port accurately. The guide 113 is arranged to be needle-shaped so that the buoyancy force of the guide 113 can be neglected too. Only the first float 1113 and the second float 1114 need to be considered to calculate the buoyancy force so as to control the buoyant member 111.

In order to reduce the gravity of the buoyant member 111 in the same volume, the first float 1113 and/or the second float 1114 can be hollow. In this embodiment, the second float 1114 is arranged to be hollow.

As illustrated in FIG. 1, a limiting member 114 is sleeved on the connection rod 1112 and located between the first float 1113 and the second float 1114. The limiting member 114 is fixedly connected to an inner wall of the liquid reservoir 1. The limiting member 114 is a limiting ring with an opening. The inner area of the limiting ring is smaller than the projection area of the first float 1113 on the horizontal plane. The maximum distance between the limiting member 114 and the top wall of the first float 1113 is smaller than the maximum distance between the top wall of the second float 1114 and the top wall of the liquid reservoir 1. Furthermore, the distance between the limiting member 114 and the bottom of the liquid reservoir 1 is greater than the distance between the bottom of the blocking member and the top of the first float 1113.

As illustrated in FIG. 1, a valve box 6 is fixed in the liquid reservoir 1. The valve box 6 accommodates the buoyant member 111. The valve box 6 is connected to the liquid reservoir 1 at the bottom. An liquid inlet port 61 is arranged in the sidewall of the valve box 6. The liquid inlet port 61 extends down to the bottom wall of the liquid reservoir 1. An air port 62 is provided in the top of the liquid reservoir 1. The buoyant member 111 is accommodated in the valve box 6 to protect the buoyant member 111 from being damaged. In addition, the valve box 6 is communicated with the liquid reservoir 1 through its top and bottom, such that the liquid level in the valve box 6 is at the same level as the liquid level in the liquid reservoir 1.

The liquid is discharged out of the liquid reservoir 1 of the negative pressure pipeline opening-and-closing device by external suction force acting over the liquid outlet port 10 from the exterior of the liquid reservoir 10. The blocking member 112 cooperates with the liquid outlet port 10. During operation of the negative pressure pipeline opening-and-closing device, the volume and weight of a buoy 1111 to be used can be determined according to the density of the liquid, so as to ensure: when the first float 1113 is completely below the liquid level and the liquid level does not reach the second float 1114, the buoyancy force $\rho_{liquid}gV_{lower-max}$ of the buoyant member 111 is greater than the total gravity of the buoyant member 111 and the blocking member 112, and is smaller than the sum of the total gravity of the buoyant member 111 and the blocking member 112 and the suction force; and when the buoyant member 111 is completely below the liquid level, the buoyancy force $\rho_{liquid}gV_{max}$ of the buoyant member 111 is greater than the sum of the total gravity of the buoyant member 111 and the blocking member 112 and the suction force.

Figure 2:
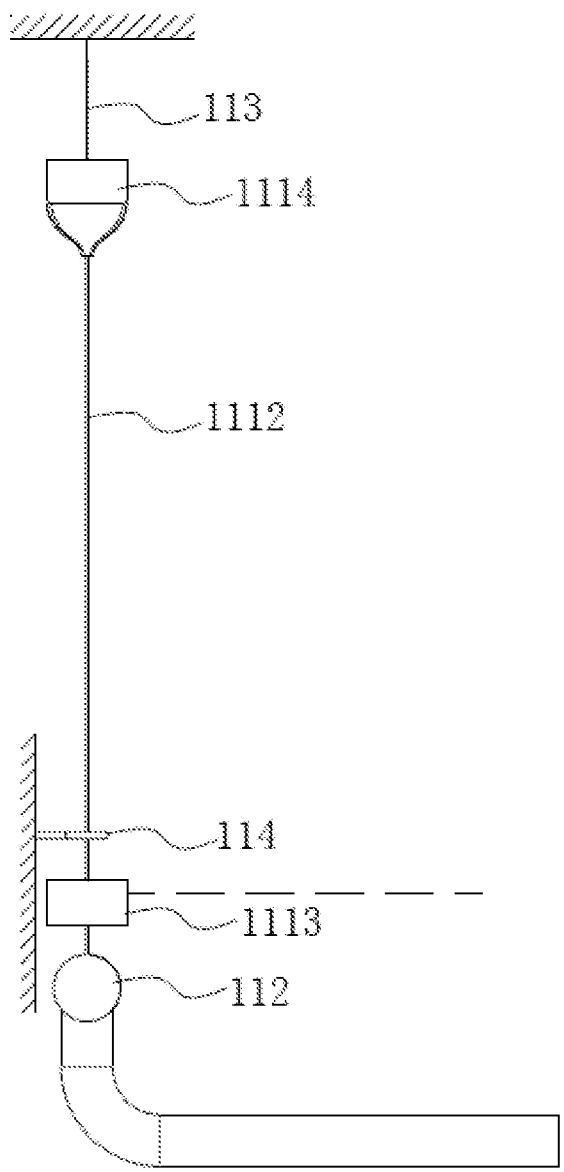
FIG. 2 is a schematic view showing that when the negative pressure pipeline opening-and-closing device in FIG. 1 operates, the blocking member blocks the liquid outlet port and the liquid level does not rise above the first float.
Figure 3:
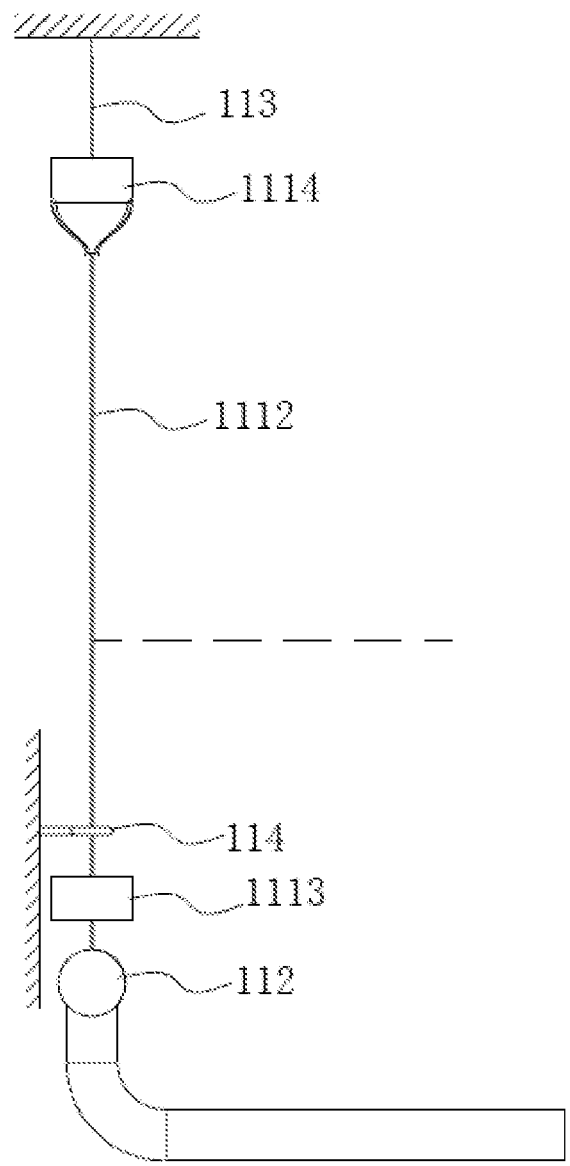
FIG. 3 is a schematic view showing that when the negative pressure pipeline opening-and-closing device of FIG. 1 operates, the blocking member blocks the liquid outlet port and the liquid level rises above the first float, but does not reach the second float.
Figure 4:
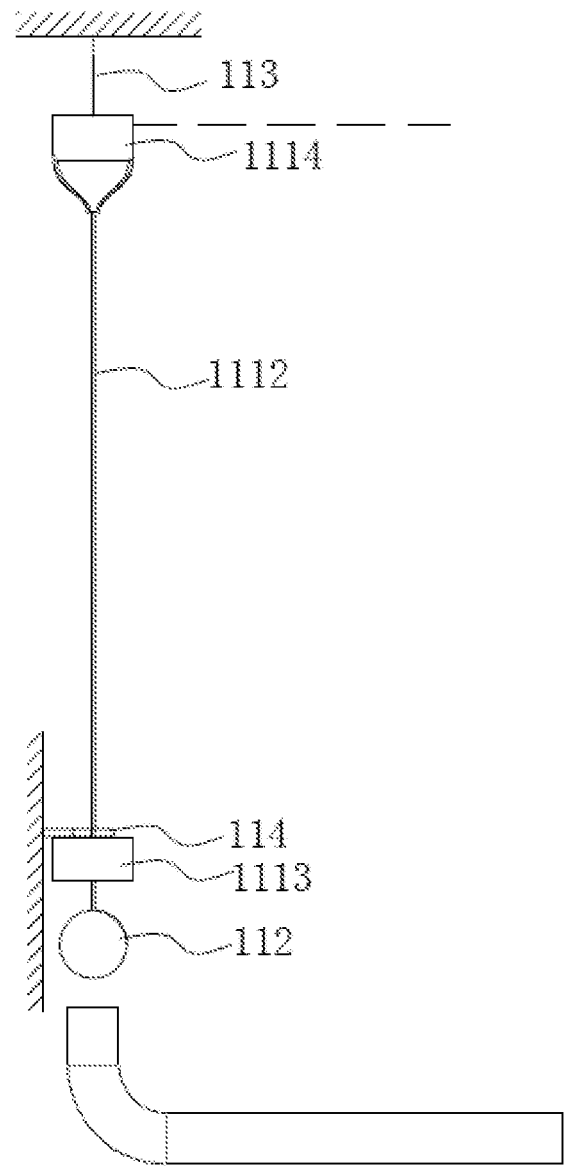
FIG. 4 is a schematic view showing that when the negative pressure pipeline opening-and-closing device in FIG. 1 operates, the total buoyancy force of the buoyant member and the blocking member is greater than the sum of their total gravity and the suction force.
Figure 5:
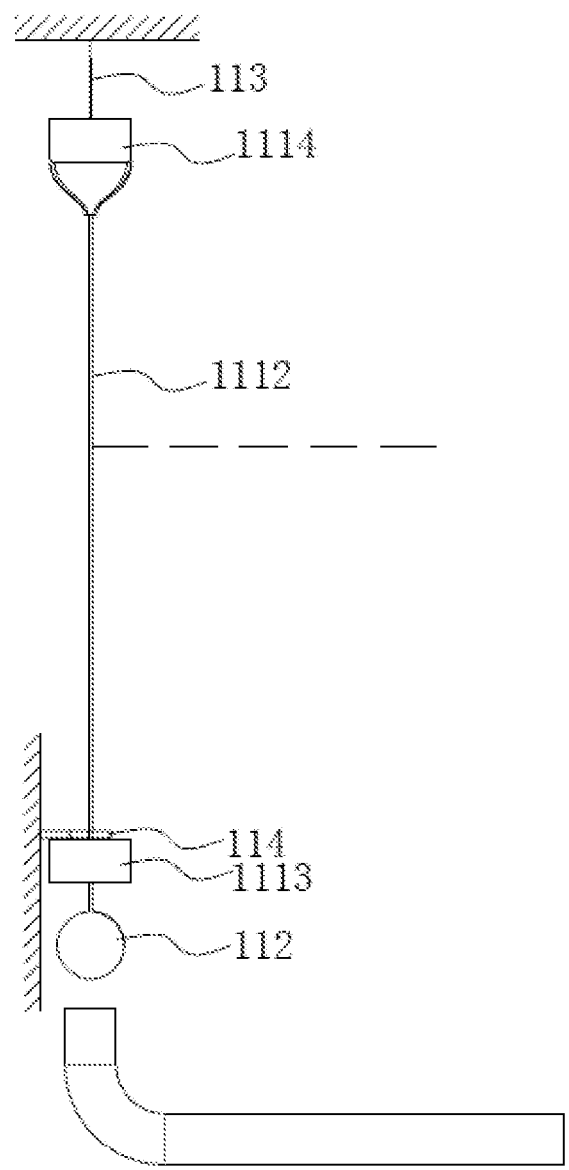
FIG. 5 is a schematic view showing that when the negative pressure pipeline opening-and-closing device in FIG. 1 operates, the liquid level is still above the first float during liquid removal.
Figure 6:
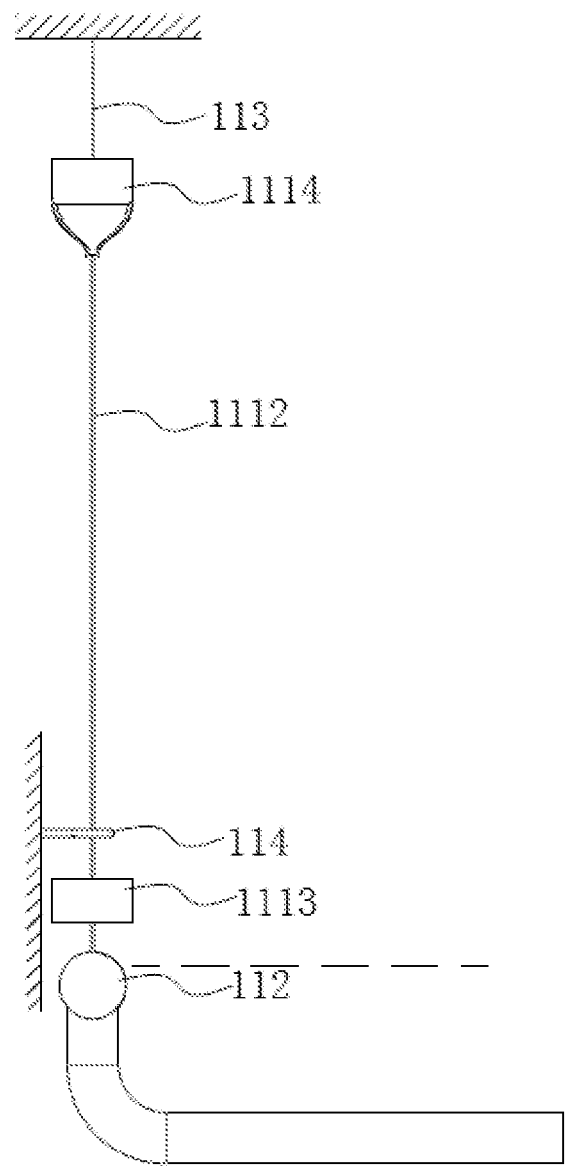
FIG. 6 is a schematic view showing that when the negative pressure pipeline opening-and-closing device in FIG. 1 operates, the total buoyancy force of the buoyant member and the blocking member equals their total gravity.

As shown in FIG. 2, when the liquid level is located at the bottom of the liquid reservoir 1 and does not reach the first float 1113 of the buoyant member 111, the blocking member 112 blocks the liquid outlet port 10 under the sum of the total gravity of the buoyant member 111 and the blocking member 112 and the suction force. As the liquid level in the liquid reservoir 1 rises, when the first float 1113 is completely below the liquid level and the liquid level does not reach the second float 1114, the buoyancy force $\rho_{liquid}gV_{lower-max}$ of the buoyant member 111 is smaller than the sum of the gravity of the buoyant member 111 and the suction force. Therefore, as shown in FIG. 3, when the liquid level does not reach the second float 1114, the blocking member 112 keeps blocking the liquid outlet port 10. Even when the buoyancy force the buoyant member 111 of the buoyant member 111 equals the sum of its gravity and the suction force, the blocking member 112 stays in place to block the liquid outlet port 10 due to the balance of the forces. As shown in FIG. 4, when the liquid level reaches the second float 1114, the buoyancy force $\rho_{liquid}gV_{lower-max}$ of the buoyant member 111 is greater than the sum of the gravity of the buoyant member 111 and the suction force, such that the buoyant member 111 drives the blocking member 112 to rise. When the first float 1113 contacts the limiting member 114, the liquid outlet port 10 is opened, such that the liquid flows into the underpressure pipeline 300 under the negative pressure gradient. As shown in FIG. 5, during the discharge of the liquid, since the blocking member 112 is separated from the liquid outlet port 10, there are only the buoyancy force and gravity acting on the float assembly 111 and the blocking member 112 and there is no suction force acting on the blocking member 112. Furthermore, due to the limiting effect of the limiting member 114 and the buoyancy force $\rho_{liquid}gV_{lower-max}$ that is greater than the gravity of the float assembly 111, the blocking member 112 will not descend as long as the liquid level is above the second float 1114 (i.e., the liquid level is above the limiting member 114). Therefore, the liquid is continuously discharged. As shown in FIG. 6, when the liquid level is below the limiting member 114, the total buoyancy force of the float assembly 111 and the blocking member 112 is continuously reduced as the liquid level falls continuously. Until the total buoyancy force of the float assembly 111 and the blocking member 112 equals the total gravity of the float assembly 111 and the blocking member 112, as the liquid level falls, the float assembly 111 and the blocking member 112 descend, such that the blocking member 112 contacts the liquid outlet port 10. At this time, there is suction force acting on the blocking member 112 to block the liquid outlet port 10, so as to stop the discharge. During this process, the blocking member 112 is always located below the liquid level, such that air is prevented from entering into the negative pressure pipeline 300. Therefore, a single phase flow of pure liquid is realized, which in turn reduces the pipeline resistance and reduces the energy consumption.

Embodiment II

The structure of embodiment II is the same as that of embodiment I. During operation of the negative pressure pipeline opening-and-closing device, the volume and weight of a buoy 1111 to be used can be determined according to the density of the liquid to ensure: when the first float 1113 is completely below the liquid level and the liquid level does not reach the second float, the buoyancy force $\rho_{liquid} gv_{lower-max}$ of the buoyant member 111 is greater than the total gravity of the buoyant member 111 and the blocking member 112 and equals the sum of the total gravity of the buoyant member 111 and the blocking member 112 and the suction force; and when the buoyant member 111 is completely below the liquid level, the buoyancy force $\rho_{liquid} gv_{lower-max}$ of the buoyant member 111 is greater than the sum of the total gravity the buoyant member 111 and the blocking member and the suction force.

Therefore, as shown in FIG. 3, when the liquid level does not reach the second float 1114, the blocking member 112 keeps blocking the liquid outlet port 10. Even when the buoyancy force $\rho_{liquid} gv_{lower-max}$ equals the sum of the gravity of the buoyant member 111 and the suction force, the blocking member 112 stay in place due to the balance of the forces. As shown in FIG. 4, at the time the liquid level reaches the second float 1114, the buoyancy force $\rho_{liquid} gv$ of the buoyant member 111 is immediately greater than the sum of the gravity of the buoyant member 111 and the suction force, such that the buoyant member 111 immediately drives the blocking member 112 to rise. When the first float 1113 contacts the limiting member 114, the liquid outlet port 10 is opened, such that the liquid flows into the underpressure pipeline 300 under the negative pressure gradient. However, since this embodiment is only applicable to a kind of liquid with certain density, its application effect is not as good as that of Embodiment 1.

Embodiment III

The structure of embodiment III is the same as that of embodiment I. However, during operation of the negative pressure pipeline opening-and-closing device, the volume and weight of a buoy 1111 to be used can be determined according to the density of the liquid to ensure: when the first float 1113 is completely below the liquid level and the liquid level does not reach the second float 1114, the buoyancy force $\rho_{liquid} gv_{lower-max}$ of the buoyant member 111 is greater than the total gravity of the buoyant member 111 and the blocking member 112 and smaller than the sum of the total gravity of the buoyant member 111 and the blocking member 112 and the suction force; and when the second float 1114 is partly below the liquid level, the buoyancy force $\rho_{liquid} gv$ of the buoyant member 111 is greater than the sum of the total gravity of the buoyant member 111 and the blocking member and the suction force.

As shown in FIG. 2, when the liquid level is located at the bottom of the liquid reservoir 1 and does not reach the first float 1113 of the buoyant member 111, the blocking member 112 blocks the liquid outlet port 10 under the sum of the total gravity of the buoyant member 111 and the blocking member 112 and the suction force. As the liquid level in the liquid reservoir 1 rises, when the first float 1113 is completely below the liquid level and the liquid level does not reach the second float 1114, the buoyancy force $\rho_{liquid} gv_{lower-max}$ of the buoyant member 111 is smaller than the sum of the gravity of the buoyant member 111 and the suction force. Therefore, as shown in FIG. 3, when the liquid level does not reach the second float 1114, the blocking member 112 keeps blocking the liquid outlet port 10. Even when the buoyancy force $\rho_{liquid} gv$ of the buoyant member 111 equals the sum of the gravity of the buoyant member 111 and the suction force, the blocking member 112 stay in place due to the balance of the forces. As shown in FIG. 4, when the liquid level reaches the second float 1114, the buoyancy force $\rho_{liquid} gv$ of the buoyant member 111 is greater than the sum of the gravity of the buoyant member 111 and the suction force, such that the buoyant member 111 drives the blocking member 112 to rise. When the first float 1113 contacts the limiting member 114, the liquid outlet port 10 is opened, such that the liquid flows into the underpressure pipeline 300 under the negative pressure gradient. As shown in FIG. 5, during the discharge of the liquid, since the blocking member 112 is separated from the liquid outlet port 10, there are only the buoyancy force and gravity acting on the buoyant member 111 and the blocking member 112 and there is no suction force acting on the blocking member 112. Furthermore, due to the limiting effect of the limiting member 114 and the buoyancy force $\rho_{liquid} gv_{lower-max}$ that is greater than its gravity, the blocking member 112 will not descend as long as the liquid level is above the second float 1114 (i.e., the liquid level is above the limiting member 114). Therefore, the liquid is kept being discharged. As shown in FIG. 6, when the liquid level is located below the limiting member 114, the total buoyancy force of the buoyant member 111 and the blocking member 112 is continuously reduced as the liquid level keeps falling. Until the total buoyancy force equals the total gravity of the buoyant member 111 and the blocking member 112, the buoyant member 111 and the blocking member 112 descend as the liquid level falls, so that the blocking member 112 contacts the liquid outlet port 10. At this time, there is suction force acting on the blocking member 112 to block the liquid outlet port 10, so as to stop the discharge. During this process, the blocking member 112 is always located below the liquid level, such that air is prevented from entering into the negative pressure pipeline 300. Therefore, a single phase flow of pure liquid is realized, which in turn reduces the pipeline resistance and reduces the energy consumption.

In this embodiment, when the second float 1114 is partly below the liquid level, the buoyancy force $\rho_{liquid} gv$ of the buoyant member 111 is greater than the sum of the total gravity of the buoyant member 111 and the blocking member 112 and the suction force. Therefore, the buoyancy force increases as the liquid level continues to rises and the change amount of the buoyancy force is large with the rise of liquid level rises, so that the sensitivity of the device is improved and the application effect of the embodiment is better than that of embodiment I.

In addition, as shown in FIG. 1, the bottom of the second float 1114 has a downward convex surface. Therefore, the change amount of the buoyancy force is increased with the rise of the liquid level. Therefore, the sensitivity of the device is improved. At the time the buoyancy force $\rho_{liquid} gv$ of the buoyant member 111 is greater than the sum of the gravity of the buoyant member 111 and the suction force, the buoyant member 111 immediately drives the blocking member 112 to rise. That is to say, when the liquid level becomes a high liquid level, the liquid outlet port 10 is immediately opened, such that the content of air entering the pipeline is less than 0.5%. Therefore, a single phase flow of pure liquid is realized, which in turn reduces the pipeline resistance and reduces the energy consumption. Further, as shown in FIG. 1, the connection rod 1112 has a length that is greater than one half the height of the liquid reservoir 1, and the total length of the blocking member 112 and the buoyant member 111 is smaller than the height of the liquid reservoir 1. Therefore, the distance between the first float 1113 and the second float 1114 can be as long as possible, so that the control stroke becomes longer to avoid frequent opening and closing of the negative pressure pipeline opening-and-closing device.

Embodiment 4

Figure 7:
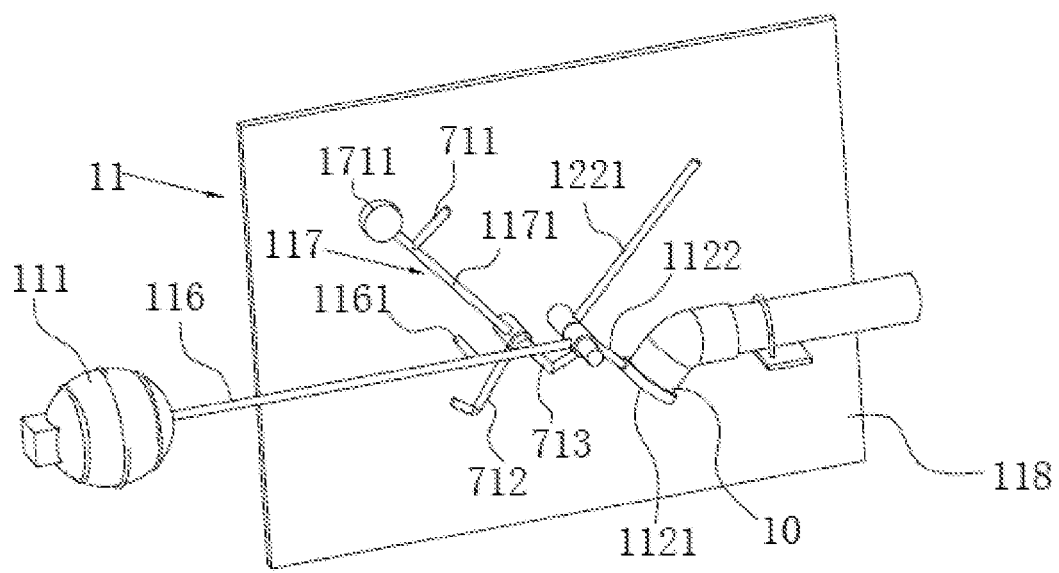
FIG. 7 is a schematic structural view showing a negative pressure pipeline opening-and-closing device provided by embodiment IV of the present application, in which the liquid outlet port is closed.

The negative pressure pipeline opening-and-closing device provided by the embodiment IV is illustrated in FIG. 7. The liquid outlet port 10 of the liquid reservoir 1 is located on the sidewall of the liquid reservoir 1. The negative pressure pipeline opening-and-closing device includes a buoyant member 111 and a blocking member 112 connected to the buoyant member 111. In this embodiment, the negative pressure pipeline opening-and-closing device is mounted on a standing plate 118 that is vertically fixed on the bottom of the liquid reservoir 1. As shown in FIG. 7, the buoyant member 111 includes a float 1111 and a first connection rod 116. One end of the first connection rod 116 is pivotably connected to the standing plate 118. The first connection rod 116 is rotated around a hinge point in a vertical plane. The float 1111 is connected to the other end of the first connection rod 116 far away from the hinge point. The blocking member 112 includes a blocking element 112 and a second connection rod 1122. The second connection rod 1122 is pivotably connected to the standing plate 118 and is coaxially rotated with the first connection rod 116. The second connection rod 1122 is rotated around the hinge point in the vertical plane. The blocking member 112 is connected to one end of the second connection rod 1122 far away from the hinge point. The negative pressure pipeline opening-and-closing device further includes an energy transferring member 117 for transferring the potential energy of the buoyant member 111 to the blocking member 112, which drives the blocking member 112 to rotate around the hinge point. Specifically, as shown in FIG. 7, the energy transferring member 117 includes a first triggering element 1161 on the first connection rod 116, a second energy receiving element 1221 on the second connection rod 1122, and an intermediate energy transferring element 1171. The intermediate energy transferring element 1171 is a rotation rod. At a location of the middle part of the intermediate energy transferring element 1171 slightly deviated from its center, the intermediate energy transferring element 1171 is connected to the standing plate 118. The intermediate energy transferring element 1171 is rotated around the hinge point in the vertical plane. As shown in FIG. 7, the rotation axis of the intermediate energy transferring element 1171 and the rotation axis of the first connection rod 116 are located on a horizontal line. The rotation plane of the intermediate energy transferring element 1171 and the rotation plane of lie in the same vertical plane. The rotation plane of the buoyant member 111 is not coplanar with the rotation plane of the intermediate energy transferring element 1171. The first triggering element 1161 is perpendicular to the rotation plane of the buoyant member 111 and extends toward to the rotation plane of the intermediate energy transferring element 1171. The second energy receiving element 1221 and the second connection rod 1122 are integrally formed with each other and are located in the rotation plane of the second connection rod 1122, such that the rotation path of the intermediate energy transferring element 1171 and the motion path of the first triggering element 1161 and the second energy receiving element 1221 cross each other. In addition, as shown in FIG. 7, a first weight 1171 is fixed at an end of the intermediate energy transferring element 1171 far away from the hinge point. The first weight 1171 is located between the buoyant member 111 and the second energy receiving element 1221 in the vertical plane. The motion path of the first weight 1711 passes directly above the hinge point of the intermediate energy transferring element 1171. A second triggering element 711 is fixed on and perpendicular to the intermediate energy transferring element 1171. The second triggering element 711 is located in the rotation plane of the intermediate energy transferring element 1171 and extends toward the second energy receiving element 1221. The liquid outlet port 10 of the liquid reservoir 1 is located in the motion path of the blocking member 112 that moves as the second connection rod 1122 moves, and an opening portion of the liquid outlet port 10 is perpendicular to a tangential direction of the motion path.

Figure 8:
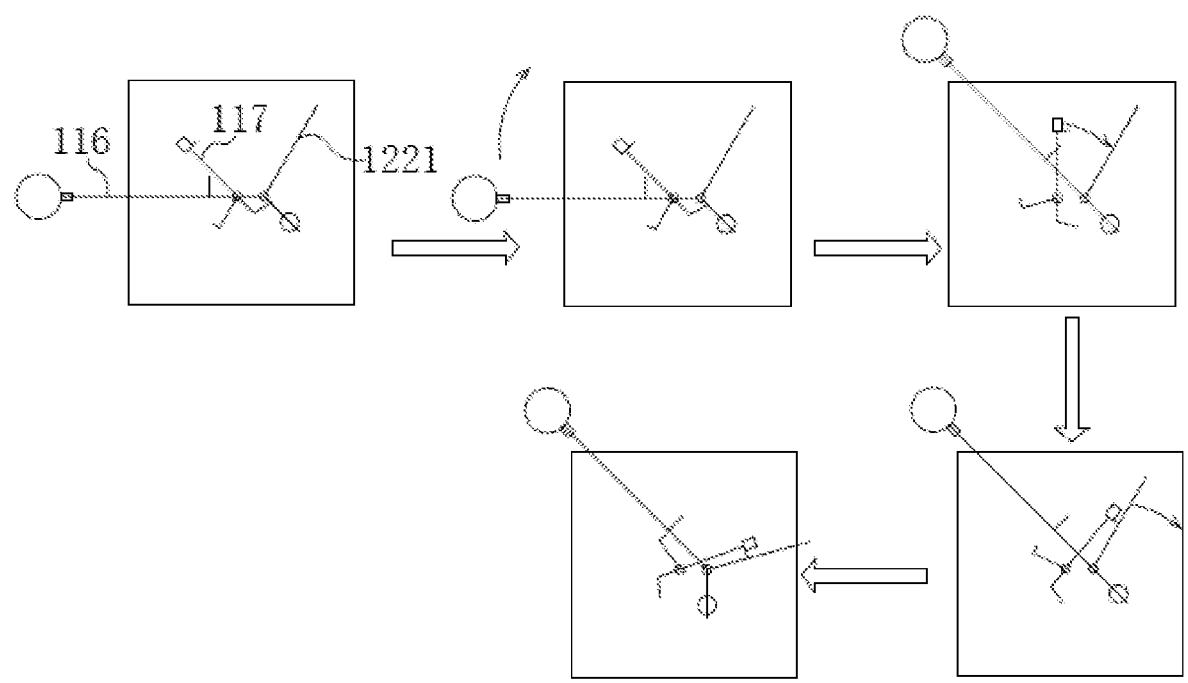
FIG. 8 is a flow chart illustrating that the blocking member of the negative pressure pipeline opening-and-closing device in FIG. 7 is driven to be opened.

Therefore, as illustrated in FIG. 8, the float 1111 rises as the liquid level in the liquid reservoir 1 rises. During this period, the float 1111 and the first connection rod 116 rotate around the hinge point between the first connection rod 116 and the standing plate 118. When the buoyant member 111 rotates such that the first triggering element 1161 contacts the intermediate energy transferring element 1171, as the liquid level continues to rise, the buoyant member 111 drives the intermediate energy transferring element 1171 rotates together with the buoyant member 111 around the hinge point between the intermediate energy transferring element 1171 and the standing plate 118 in the same direction. When the first weight 1711 at the end of the intermediate energy transferring element 1171 reaches its highest point, under inertia and under the gravity of the first weight 1711, the intermediate energy transferring element 1171 continues to rotate in the original direction. As a result, the intermediate energy transferring element 1171 contacts the second energy receiving element 1221 of the blocking member 112. The second energy receiving element 1221 is forced to rotate together with the intermediate energy transferring element 1171 around the hinge point between the second energy receiving element 1221 and the standing plate 118 in the same direction, such that the second connection rod 1122 that is connected to the second energy receiving element 1221 drives the blocking member 112 to move far away from the liquid outlet port 10. The liquid outlet port 10 is immediately opened, and then, the liquid flows into the underpressure pipeline 300. That is to say, when the liquid level becomes a high liquid level, the liquid outlet port 10 is immediately opened, such that the content of air entering the pipeline is less than 0.5%. Therefore, a single phase flow of pure liquid is realized, which in turn reduces the pipeline resistance and reduces the energy consumption.

Figure 9:
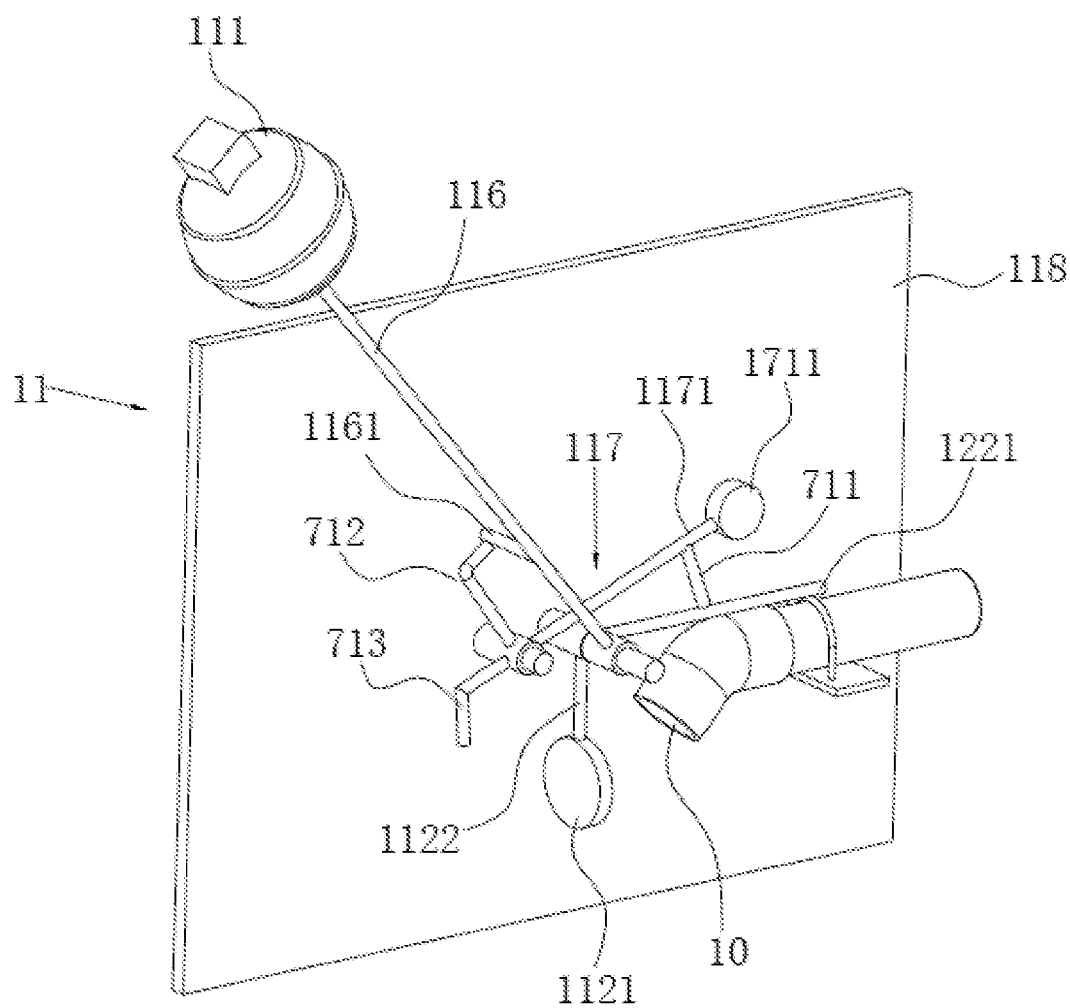
FIG. 9 is a schematic structural view showing a negative pressure pipeline opening-and-closing device provided by embodiment IV of the present application, in which the liquid outlet port is opened.

As illustrated in FIG. 9, the third energy receiving element 712 and the third triggering element 713 are fixed to the intermediate energy transferring element 1171. The third triggering element 713 is arranged at an end of the intermediate energy transferring element 1171 adjacent to the hinge point. Further, the third triggering element 713 lies in the rotation plane of the intermediate energy transferring element 1171 and extends toward the second connection rod 1122. The third energy receiving element 712 is connected to the intermediate energy transferring element 1171 and located between the third triggering element 713 and the intermediate energy transferring element 1171. The rotation path of the first triggering element 1161 and the rotation path of the energy receiving element 712 cross each other, and the rotation path of the third triggering element 713 and the motion path of the second connection rod 1122 cross each other. In addition, as shown in FIG. 9, when the blocking member 112 is far away from the liquid outlet port 10 (i.e., the liquid outlet port 10 is in an open state), the third energy receiving element 712 is located above the liquid level where the highest point of the liquid outlet port 10 is located. Therefore, before the liquid level drops to the location of the liquid outlet port 10, the liquid outlet port 10 can be closed, such that the liquid flows into the underpressure pipeline 300 under the negative pressure gradient. A single phase flow of pure liquid is realized, which in turn reduces the pipeline resistance and reduces the energy consumption.

Figure 10:
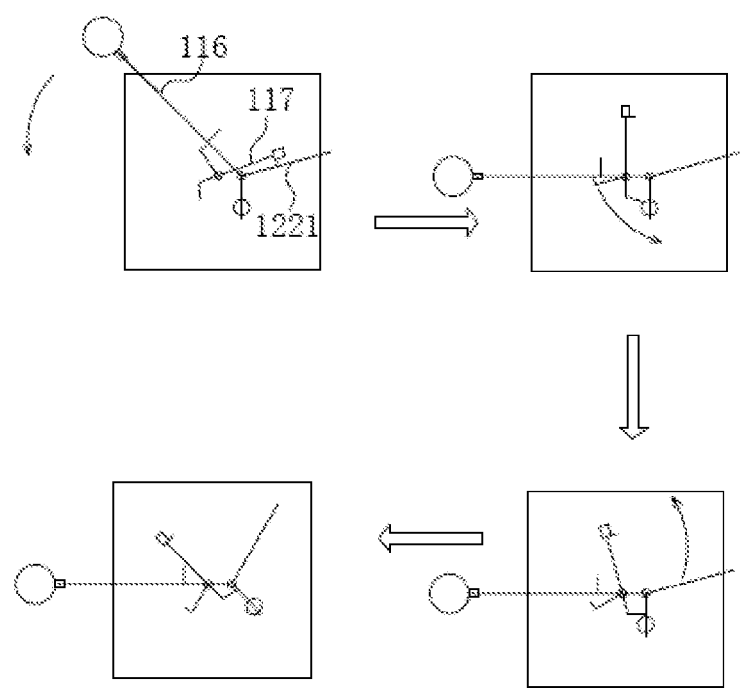
FIG. 10 is a flow chart illustrating that the blocking member of the negative pressure pipeline opening-and-closing device in FIG. 9 is driven to be closed.

Therefore, as illustrated in FIG. 10, the float 1111 drops as the liquid level in the liquid reservoir 1 drops. During this period, the float 1111 and the first connection rod 116 rotate around the hinge point between the first connection rod 116 and the standing plate 118. When the buoyant member 111 rotates such that the first triggering element 1161 contacts the third energy receiving element 712, as the liquid level continues to drop, the buoyant member 111 drives the intermediate energy transferring element 1171 to rotate together with the buoyant member 111 around the hinge point between the intermediate energy transferring element 1171 and the standing plate 118 in the same direction. When the first weight 1711 at the end of the intermediate energy transferring element 1171 reaches its highest point, under inertia and under the gravity of the first weight 1711, the intermediate energy transferring element 1171 continues to rotate in the original direction. As a result, the third triggering element 713 contacts the second energy receiving element 1122 of the blocking member 112. The second connection rod 1122 is forced to rotate together with the intermediate energy transferring element 1171 around the hinge point between the second connection rod 1122 and the standing plate 118 in the same direction, such that the second connection rod 1122 drives the blocking member 112 to block the liquid outlet port 10. The liquid outlet port 10 is closed to stop discharging of liquid.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A negative pressure pipeline opening-and-closing device, wherein:

the negative pressure pipeline opening-and-closing device comprises a blocking member for blocking a liquid outlet port of a liquid reservoir and a buoyant member connected to the blocking member;

the buoyant member comprises two floats and a connection rod connected to the two floats, the liquid reservoir is provided with a guide therein, and the guide confines the two floats, the blocking member and the liquid outlet port in a same vertical line, a limiting member is arranged between the two floats and is fixed to an inner wall of the liquid reservoir, a maximum distance between the limiting member and a top wall of a lower float of the two floats is smaller than a maximum distance between a top wall of an upper float of the two floats and a top wall of the liquid reservoir;

the connection rod has a length that is greater than one half the height of the liquid reservoir, and the total length of the blocking member and the buoyant member is smaller than the height of the liquid reservoir; and a valve box is arranged in the liquid reservoir, accommodates the buoyant member, and is communicated with the liquid reservoir through top and bottom of the valve box; a liquid inlet port is arranged in the sidewall of the valve box, the liquid inlet port extends down to a bottom wall of the liquid reservoir, and an air port is provided in a top of the liquid reservoir.

2. The negative pressure pipeline opening-and-closing device according to claim 1, wherein the guide is a needle-shaped sliding axle that is fixed to the inner wall of the liquid reservoir, and the connection rod is a sleeve that is sleeved on the guide.

3. The negative pressure pipeline opening-and-closing device according to claim 1, wherein the upper float and/or the lower float are hollow.

4. The negative pressure pipeline opening-and-closing device according to claim 1, wherein the limiting member is a limiting ring with an opening, and an inner area of the limiting ring is smaller than a projection area of the lower float on a horizontal plane.

5. The negative pressure pipeline opening-and-closing device according to claim 1, wherein a bottom of the upper float has a downward convex surface.

* * * * *